US009778921B2

(12) United States Patent
Quennesson et al.

(10) Patent No.: US 9,778,921 B2
(45) Date of Patent: Oct. 3, 2017

(54) METHOD FOR CREATING, EXPORTING, SHARING, AND INSTALLING GRAPHICS FUNCTIONAL BLOCKS

(75) Inventors: Kevin Quennesson, San Francisco, CA (US); Alessandro Sabatelli, San Francisco, CA (US); Troy Koelling, Santa Clara, CA (US); Michael Matas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1511 days.

(21) Appl. No.: 12/477,003

(22) Filed: Jun. 2, 2009

(65) Prior Publication Data
US 2010/0306651 A1 Dec. 2, 2010

(51) Int. Cl.
*G06F 9/45* (2006.01)
*G06F 9/44* (2006.01)

(52) U.S. Cl.
CPC . *G06F 8/51* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 5,969,716 A * | 10/1999 | Davis et al. | | 715/726 |
| 6,069,629 A | 5/2000 | Paterson et al. | | |
| 6,233,540 B1 * | 5/2001 | Schaumont | G06F 17/5022 | 703/14 |
| 6,282,699 B1 * | 8/2001 | Zhang et al. | | 717/109 |
| 6,320,598 B2 * | 11/2001 | Davis et al. | | 345/648 |
| 6,594,822 B1 | 7/2003 | Schweitz et al. | | |
| 6,606,588 B1 * | 8/2003 | Schaumont | G06F 17/5045 | 703/15 |
| 6,964,029 B2 * | 11/2005 | Poznanovic | G06F 17/5045 | 716/105 |
| 7,039,866 B1 | 5/2006 | Rosenberg et al. | | |
| 7,058,896 B2 | 6/2006 | Hughes | | |
| 7,278,115 B1 * | 10/2007 | Conway et al. | | 715/838 |

(Continued)

OTHER PUBLICATIONS

"Quartz Composer Programming Guide," Apple Inc., Cupertino, California, Oct. 15, 2008, 32 pages.

(Continued)

*Primary Examiner* — Henry Tsai
*Assistant Examiner* — Christopher Bartels
(74) *Attorney, Agent, or Firm* — Blakely, Sokoloff, Taylor & Zafman LLP

(57) ABSTRACT

Systems, apparatuses, computer readable media, and methods for creating, exporting, sharing, and installing graphics functional blocks are described herein. In one embodiment, a selection is received from a graphical user interface (GUI) for one or more patches of multiple linked patches representing a graphics composition. In response to the selection, a dependency analysis is performed to determine one or more related patches that have a dependency relationship with the selected patches. Based on the dependency analysis, source code associated with the selected patches and the related patches is extracted without extracting source code of unselected and unrelated patches. Thereafter, the selected patches, the related patches, and the extracted source code are exported into a composition file to be shared with another user. Other methods and apparatuses are also described.

24 Claims, 10 Drawing Sheets

(56) References Cited

U.S. PATENT DOCUMENTS

| | | | |
|---|---|---|---|
| 7,536,676 B2* | 5/2009 | Baker et al. | 717/113 |
| 2002/0072893 A1* | 6/2002 | Wilson | G06F 13/1605 703/26 |
| 2003/0061399 A1* | 3/2003 | Wagener et al. | 709/321 |
| 2003/0103083 A1* | 6/2003 | Denny et al. | 345/771 |
| 2003/0174165 A1* | 9/2003 | Barney | 345/747 |
| 2003/0218628 A1 | 11/2003 | Deshpande et al. | |
| 2004/0117333 A1 | 6/2004 | Voudouris et al. | |
| 2004/0138824 A1* | 7/2004 | Da et al. | 702/20 |
| 2004/0189720 A1* | 9/2004 | Wilson | G06K 9/00355 715/863 |
| 2004/0250236 A1* | 12/2004 | O'Malley et al. | 717/104 |
| 2005/0065913 A1* | 3/2005 | Lillie et al. | 707/3 |
| 2005/0086344 A1* | 4/2005 | Suesserman | 709/227 |
| 2005/0108384 A1* | 5/2005 | Lambert et al. | 709/224 |
| 2005/0188259 A1 | 8/2005 | Zweifel | |
| 2005/0243346 A1* | 11/2005 | Foehr et al. | 358/1.9 |
| 2006/0038811 A1* | 2/2006 | Owens et al. | 345/418 |
| 2006/0064685 A1 | 3/2006 | DeFolo | |
| 2006/0121436 A1* | 6/2006 | Kruse et al. | 434/433 |
| 2006/0274070 A1* | 12/2006 | Herman et al. | 345/474 |
| 2007/0018980 A1* | 1/2007 | Berteig et al. | 345/426 |
| 2007/0060337 A1 | 3/2007 | Abe | |
| 2007/0124322 A1* | 5/2007 | Meyer et al. | 707/102 |
| 2007/0129916 A1 | 6/2007 | Muller et al. | |
| 2007/0153005 A1 | 7/2007 | Asai et al. | |
| 2007/0162853 A1 | 7/2007 | Weber et al. | |
| 2007/0182747 A1 | 8/2007 | Harper et al. | |
| 2007/0236509 A1* | 10/2007 | Eldridge et al. | 345/619 |
| 2008/0028918 A1 | 2/2008 | Latour | |
| 2008/0030504 A1 | 2/2008 | Brunner et al. | |
| 2008/0034292 A1 | 2/2008 | Brunner et al. | |
| 2008/0103786 A1* | 5/2008 | Zhang et al. | 705/1 |
| 2008/0104143 A1* | 5/2008 | Khor et al. | 707/204 |
| 2008/0158148 A1 | 7/2008 | Madonna et al. | |
| 2008/0168384 A1 | 7/2008 | Platzer et al. | |
| 2008/0303839 A1 | 12/2008 | Quennesson et al. | |
| 2008/0304770 A1 | 12/2008 | Latour et al. | |
| 2008/0307307 A1 | 12/2008 | Ciudad et al. | |
| 2009/0219284 A1* | 9/2009 | Maillot et al. | 345/420 |
| 2009/0259450 A1 | 10/2009 | Cleary et al. | |
| 2009/0271309 A1* | 10/2009 | Gordon et al. | 705/37 |
| 2010/0122243 A1* | 5/2010 | Breton et al. | 717/163 |
| 2010/0325608 A1* | 12/2010 | Radigan | G06F 8/456 717/106 |
| 2011/0064388 A1* | 3/2011 | Brown et al. | 386/285 |
| 2011/0263332 A1* | 10/2011 | Mizrachi | 463/42 |

OTHER PUBLICATIONS

"Working with Quartz Composer," Apple Inc., Cupertino, California, Developer Connection, Oct. 30, 2008, 10 pages.

Sadun, Erica "Getting Started with Quartz Composer," O'Reilly Media, Inc., MacDevCenter, http://www.macdevcenter.com/pub/a/mac/2006/03/23/quartz-composer.html, Mar. 23, 2006, 11 pages.

"LabVIEW Control Design User Manual", National Semiconductor, Jun. 2008, Chapter 4, pp. 4-1 through 4-18.

"LabVIEW", accessed at https://en.wikipedia.org/wiki/LabVIEW on Oct. 2, 2015, last updated Sep. 5, 2015, 10 pages; see especially, p. 2: Dataflow Programming and Graphical Programming and p. 5: Light weight applications.

* cited by examiner

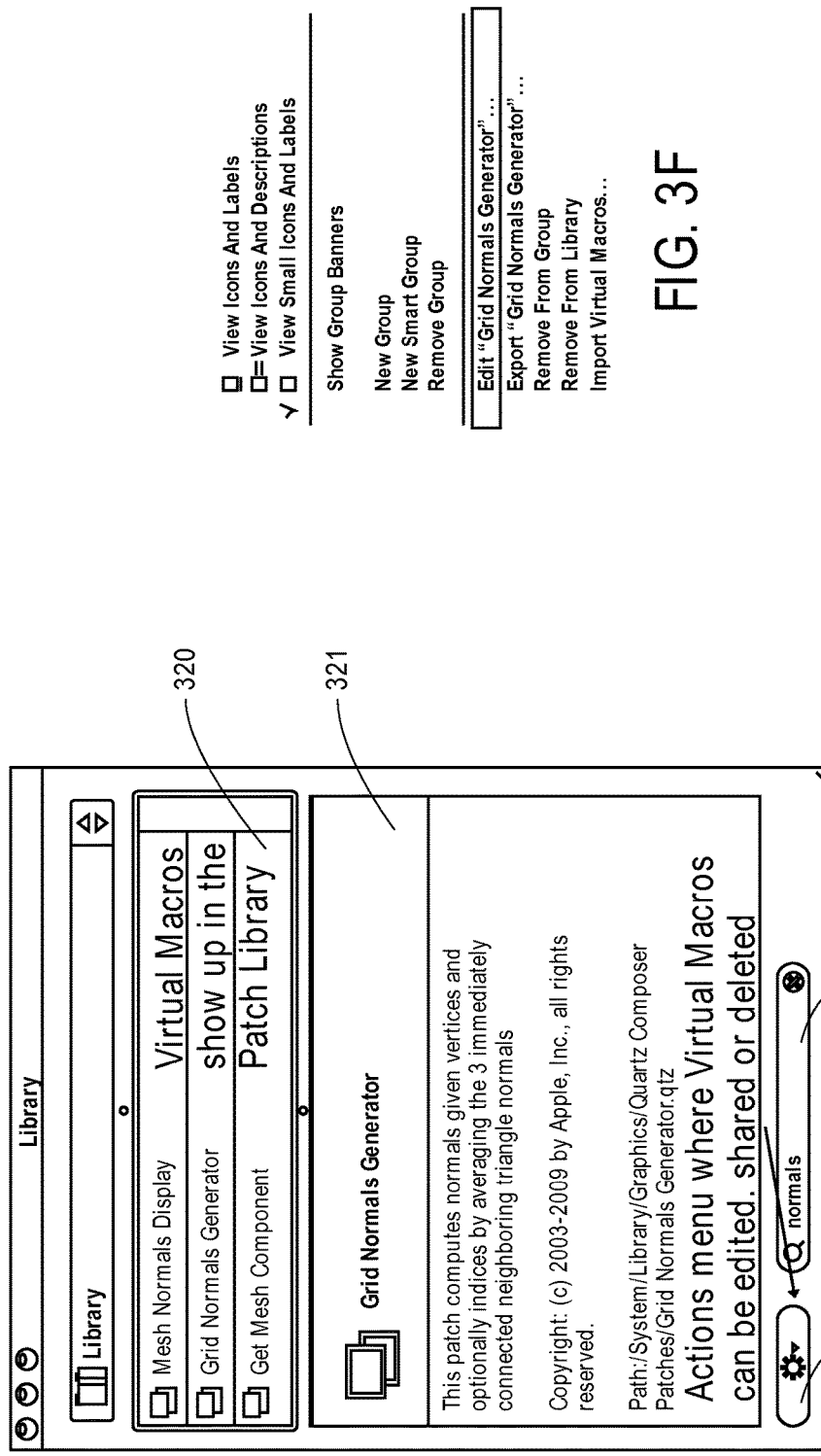

US 9,778,921 B2

METHOD FOR CREATING, EXPORTING, SHARING, AND INSTALLING GRAPHICS FUNCTIONAL BLOCKS

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to graphics development frameworks. More particularly, this invention relates to methods for manipulating graphics compositions.

BACKGROUND

In computer graphics, one can create motion graphics programs called "compositions." Compositions are a relatively simple way in which a user can intuitively create motion graphical effects (such as a moving background, flashing text, etc.) without extensive knowledge of how to program a computer. An exemplary program that allows for the creation of composition files is known as the Quartz Composer™, available from Apple Inc.

Quartz Composer is based on and brings together several graphical and non-graphical technologies, such as Quartz 2D, Core Image, Core Video, OpenGL, QuickTime, MIDI System Services, and Real Simple Syndication. As a result, once created, compositions can be incorporated into any number of applications, such as iPhoto, iMove, iChat, etc.

When creating a composition file, the editor portion of the Quartz Composer program contains a grid for assembling and connecting "patches", which are selected from a library. Patches are like functions, and may take input parameters (the left side of the patches) and provide output results (the right side of the patches). Within the editor, patches can be visually connected together by links to create a composition which essentially defines the data flow or the manner in which graphical motion data is processed by the composition.

A benefit of the Quartz Composer format is the ease with which a user can quickly create a relatively complicated graphical composition. However, there has been a lack of mechanisms in which a user can easily share a portion of a composition with another user.

SUMMARY OF THE DESCRIPTION

Systems, apparatuses, computer readable media, and methods for creating, exporting, sharing, and installing graphics functional blocks are described herein. In one embodiment, a selection is received from a graphical user interface (GUI) for one or more patches of multiple linked patches representing a graphics composition. In response to the selection, a dependency analysis is performed to determine one or more related patches that have a dependency relationship with the selected patches. Based on the dependency analysis, source code associated with the selected patches and the related patches is extracted without extracting source code of unselected and unrelated patches. Thereafter, the selected patches, the related patches, and the extracted source code are exported into a composition file to be shared with another user.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A-3F are screenshots illustrating a graphical user interface of a graphics development framework according to some embodiments.

DETAILED DESCRIPTION

Systems, apparatuses, computer readable media, and methods for creating, exporting, sharing, and installing graphics functional blocks are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a graphics development framework includes import and export functionality that can import at least a portion of a composition from an external environment such as another user and/or export at least a portion of a composition to be shared with another user. For example, a user can import an existing composition and display it in an editor of the development framework as linked visual objects (also referred to as patches). The user can select some of the patches for export purpose. In response, the development framework is configured to automatically perform a dependency analysis between the selected patches and the rest of the patches. The underlying source code in a variety of programming languages (e.g., extensible markup language or XML) can then be extracted based on the dependency analysis to include any related patches (e.g., parent or child patches) and/or the related primitives (e.g., basic building blocks or basic patches). Thereafter, the selected patches and/or extracted source code can be stored as a new composition, a new patch, or a new virtual macro (e.g., a combination of multiple patches) in a library, which can be shared (e.g., exported/imported) with another user. When another user imports a patch or composition, certain patches or primitives stored locally having the similar functionality can be updated with the ones extracted from the imported composition or patch. As a result, development of a user can be reused by another user without having to reconstruct the composition or patches.

Figure 1:
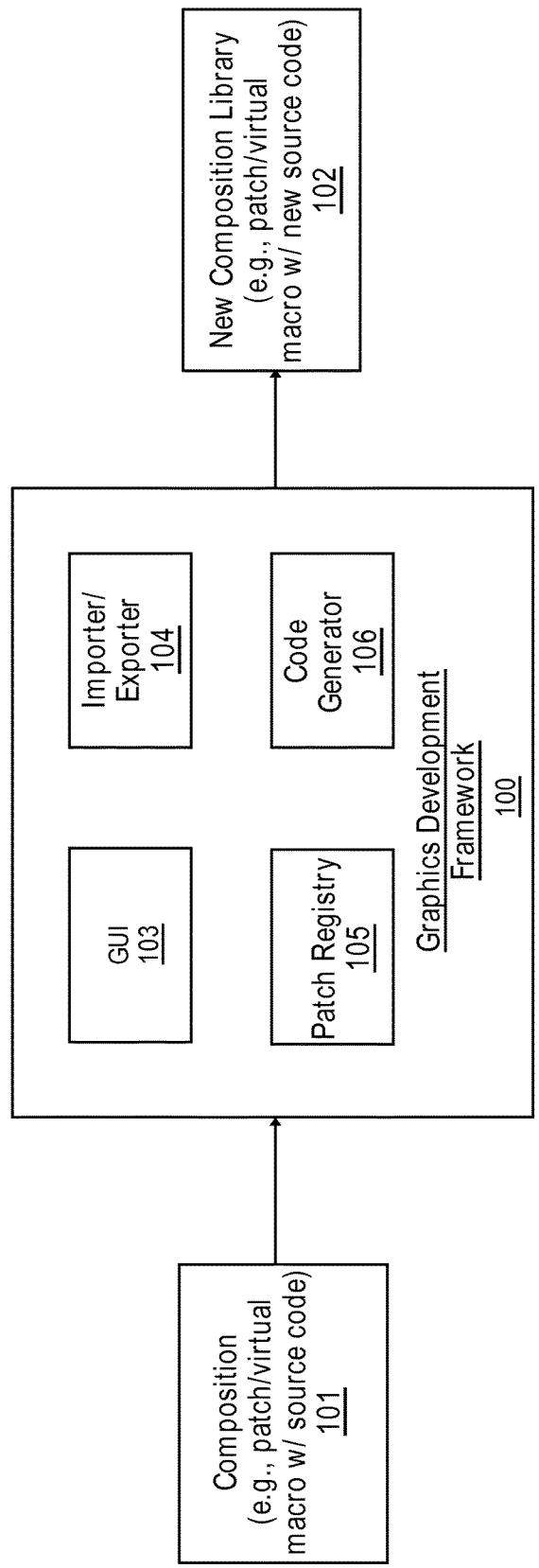
FIG. 1 is a block diagram illustrating graphics development framework architecture according to one embodiment.

FIG. 1 is a block diagram illustrating graphics development framework architecture according to one embodiment. For example, graphics development framework 100 may be implemented as part of Quartz Composer available from Apple Inc. of Cupertino, Calif. Referring to FIG. 1, according to one embodiment, graphics development framework 100 includes a graphical user interface (GUI) 103, an importer/exporter 104, a patch registry 105, and a code generator 106. GUI 103 may include an editor to allow a user to visually edit patches of a composition, a viewer to instantly display or render the composition, and an inspector to allow a user to display and edit parameters of the composition or patches.

Importer/exporter 104 is configured to import a composition 101 to be displayed and/or edited via GUI 103. The importer/exporter is also responsible for exporting at least a portion of the composition or patches to a new composition 102 for sharing purpose. In addition, patch registry 105 is used store a variety of patches created by a user (e.g., libraries), either created locally or imported from an external source. When a user selects at least a portion of the patches or composition to be exported, code generator 106 is configured to extract any related underlying source code to be packaged into the new composition 102. Note that for the purpose of illustration, composition 101 may also be created internally by framework 100. Also note that, some or all of the components of framework 100 may be implemented in logics which may include software, hardware, or a combination thereof.

Figure 2:
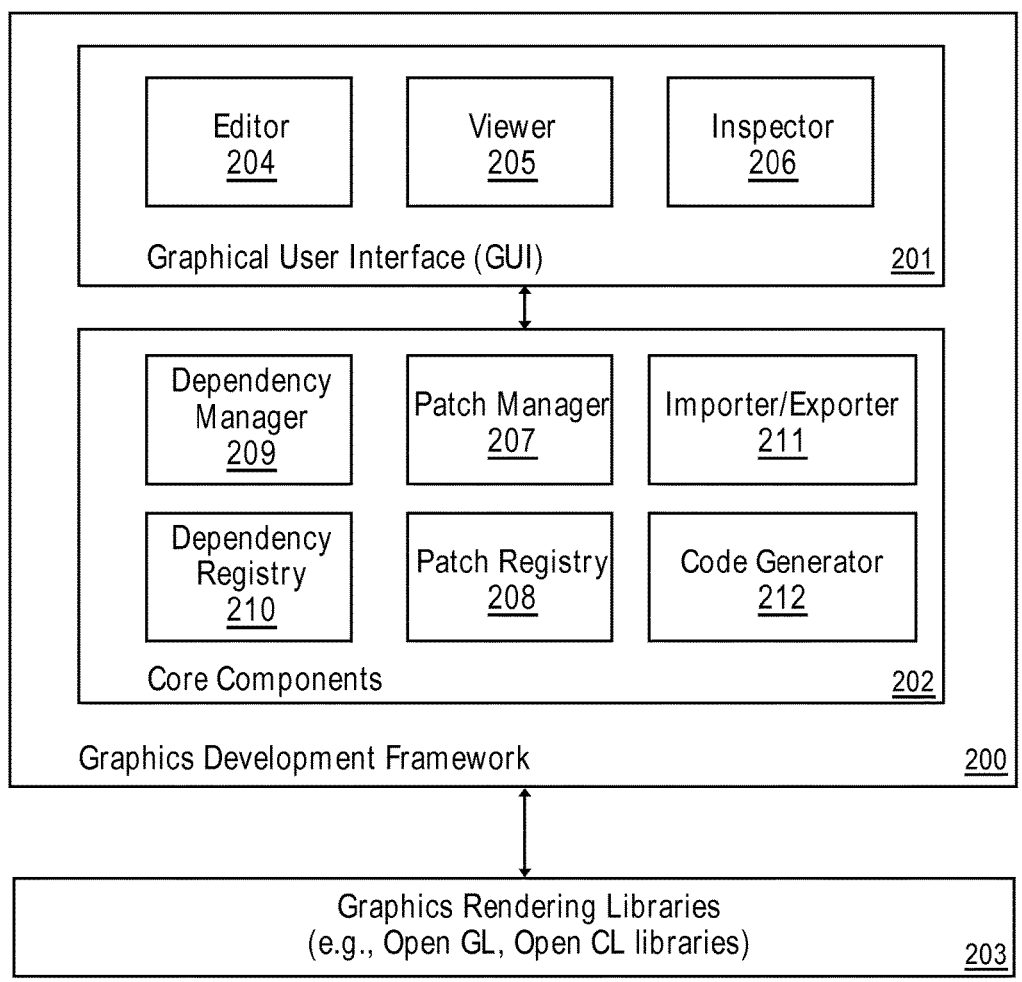
FIG. 2 is a block diagram illustrating graphics development framework architecture according to one embodiment.

FIG. 2 is a block diagram illustrating graphics development framework architecture according to one embodiment. For example, framework 200 may be implemented as part of framework 100 of FIG. 1. Referring to FIG. 2, the system architecture includes graphics development framework 200 communicatively coupled to a set of graphics rendering libraries 203, such as, for example, Open GL or Open CL core libraries, which may take advantage of certain graphics rendering hardware such as a CPU (central processing unit) and/or a GPU (graphics processing unit), etc.

Graphics development framework 200 includes a GUI component 201 and core components 202. GUI 201 includes an editor 204, a viewer 205, and an inspector 206. Editor 204 is configured to allow a user to visually edit patches of a composition. Viewer 205 is configured to instantly display or render the composition currently being edited in editor 204. Inspector 206 is configured to allow a user to display and edit internal settings or parameters of the composition or patches currently being edited.

Graphics development framework 200 provides a higher level development environment to users using an approachable visual programming paradigm. Instead of writing pages worth of code to directly manipulate the various graphics APIs (of graphics rendering libraries 203), a user can work visually with processing units called patches via editor 204. These patches are connected into composition. As a user works with a composition, adding patches and connecting them, a user can visually see the results in viewer 205. Each and every change a user makes is immediately reflected in viewer 205 and no compilation is required.

A patch is similar to a subroutine in a traditional programming environment. A patch has an interface where data can enter or exit. Such an interface is also referred to as a port. A patch can contain another patch. Such a patch is also referred to as a macro patch. A user can encapsulate one or more patches in a macro patch and make it more usable. From viewer 204, a user can select and enter a macro patch and all its sub-patches are displayed. The parent patch and the siblings to the parent patch may be hidden, allowing the user to focus on the sub-function that the macro performs. A virtual macro is an external reference to a macro. In this way, a user can share functionality or reference it inside their composition without having to duplicate the primitives that the macro contains.

Note that a patch is a very abstract concept. A patch can represent some JavaScript code or some OpenCL or CoreImage/GLSL kernel. This maps then very well for a web environment. For instance, in the case of Web applications, lots of JavaScript source and related modules/libraries/"functional blocks" are downloaded to run a Web application, and the code is then optimized and compiled (Just-In-Time compiler or JIT) to run faster on a client machine. Assuming that now some modules were present on the client already as virtual macros, we could significantly reduce launch time of the application by using the ones already compiled locally on the client. This works also for other languages, such as C, C++, OpenCL, etc.

In an OpenCL environment, whenever an OpenCL kernel is opened through an OpenCL kernel patch, to compile the kernel on the current GPU (graphics processing unit) and save the compiled binary within the OpenCL patch. Typically, the compilation is relatively expensive for OpenCL. According to one embodiment, the next time the OpenCL kernel patch is loaded and if the GPU is the same, we can just select the binary, send it to the GPU and skip compilation. This will tremendously reduce the loading time.

Referring back to FIG. 2, in one embodiment, core components 202 includes a patch manager 207 for managing patches stored in a patch registry 208. The patches may be organized in one or more libraries as part of patch registry 208. Core components 202 further includes a dependency manager 209 for managing dependency relationships of patches, which are stored in the dependency registry 210. As described above, a patch may include one or more sub-patches and thus, a patch of a composition may depend from another patch. The dependency relationship information stored in dependency registry 210 may be used by an import/export module 211 and code generator 212 for exporting certain patches to be shared with another user.

According to one embodiment, in response to a user request for exporting a selected patch, the dependency manager 209 retrieves the dependency relationship information from dependency registry 210 or alternatively, dynamically performs a dependency analysis. Based on the dependency analysis, code generator unit 212 extracts the source code associated with the patch being exported, including any source code of other patches having a dependency relationship with the patch being exported. In one embodiment, only the source code associated with the exported patches are extracted. Source code associated with a patch that is not selected and has no dependency relationship with the selected patch is not extracted.

For example, if a composition currently displayed on editor 204 includes three patches: A-B-C. If a user selects patches B and C only for export, source code associated with patches B and C are extracted without including source code of patch A. In addition, if patch C depends from patch D (based on a dependency analysis performed by dependency manager 209), the source code associated with patch D may also be extracted.

The selected patch and the generated source code are packaged and saved as a composition file, which may be organized in one or more libraries as part of patch registry 208. A composition file is created through the connection (e.g., dependency relationship) of patches in a composition editor 204. Once saved to a library, a composition file is assigned with a unique identifier, for example, in a form of unique text string. This allows the composition file to be reliably and persistently identified independent of the client application or of the computer. The identifier may remain identical even if the composition file is moved to a new location within the repository, or installed in a repository of another computer. Note that some or all of the components as shown in FIG. 2 may be implemented in software, hardware, or a combination of both.

Figure 3A:
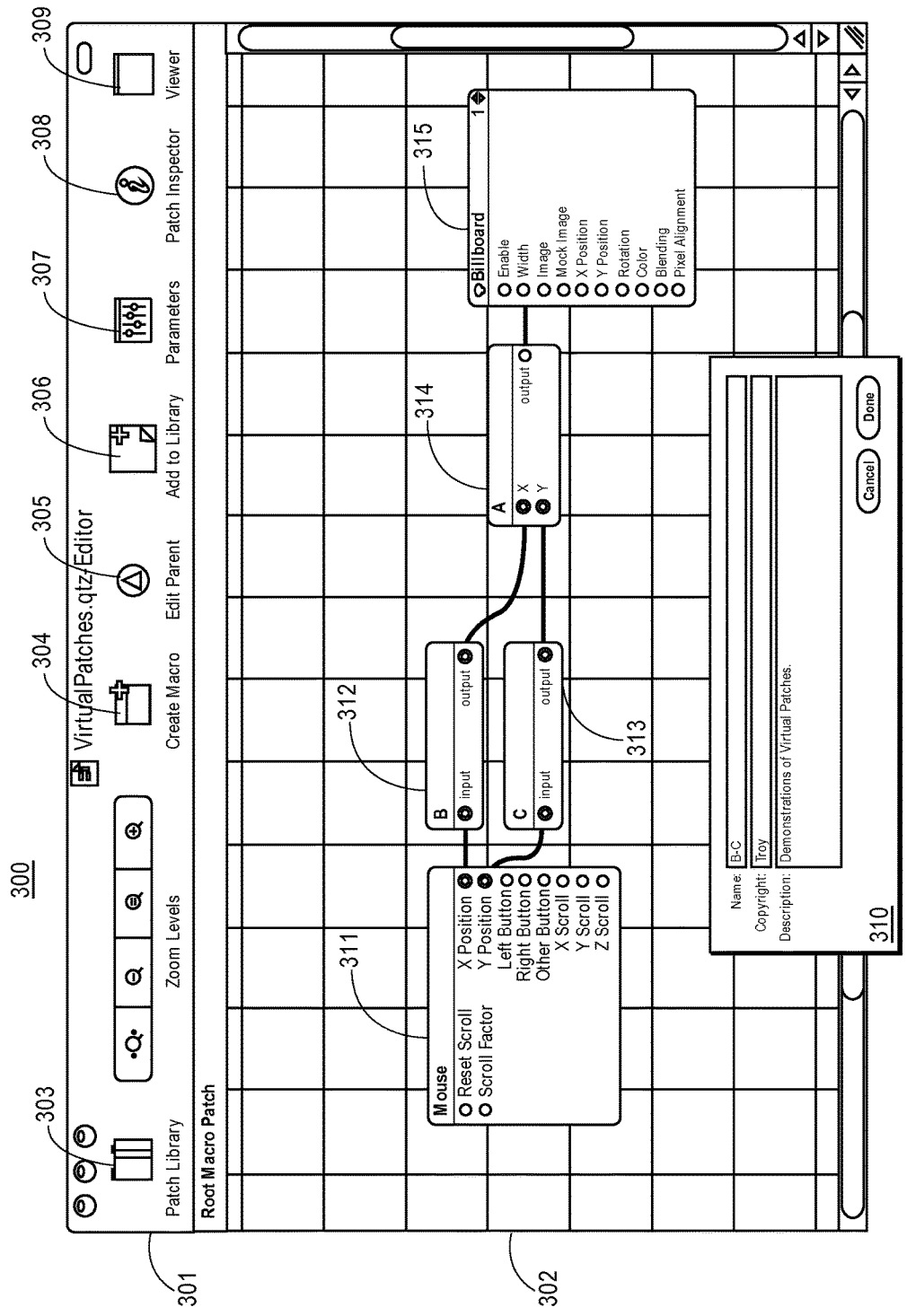

FIGS. 3A-3F are screenshots illustrating a graphical user interface of a graphics development framework according to some embodiments. For example, GUI 300 may be implemented as part of GUI 201 of FIG. 2. Specifically, GUI 300 may be part of editor 202 of FIG. 2. Referring to FIG. 3A, GUI 300 includes a toolbar 301 and an editing window 302. Toolbar 301 includes one or more buttons that can be used to manipulate graphical representations representing patches displayed in the editing window 302. In one embodiment, toolbar 301 includes, but is not limited to, a patch library button 303, a create macro button 304, an edit parent button 305, an add-to-library button 306, a parameter button 307, a patch inspector button 308, and a viewer button 309.

Within editing window 302, patches 311-315 can be visually connected together via one or more links to create a composition which essentially defines the data flow or the manner in which graphical motion data is processed by the composition. In this example, the data flow described by patches 311-315 affects the X and Y floating point coordinates coming from the user's mouse 10 device and sets their combined value as the width on the Billboard, a patch that renders a quad to the screen. The function of patches 311-315 could be anything from computing mathematical values, storing incoming numbers to RAM memory or a storage device, or calling out to any framework on the computer. An example of underlying pseudo code is listed in Appendix A.

Patch library button 303 when activated, displays a list of libraries of patches previously created, for example, as shown in FIG. 3E. From the displayed libraries, a user can select and open a library to select a patch to be included in a current project currently edited in the editing window 302. In this example, there are five patches 311-315 which are selected and placed (e.g., drag-n-drop) from one or more libraries displayed, for example, in GUI as shown in FIG. 3E.

Each of the displayed patches can be selected (e.g., highlighted) and its parameters or configuration can be edited. For example, a user can select a patch and activate the parameters button 307 to display a set of configurable parameters or attributes that can be modified, which may change the characteristics and/or behavior of the selected patch. This button may act on many selected patches at once, and the parameters for each are concatenated along the right hand side of the workspace window. Inspector button 308 is also used to edit parameters but is different by opening a separate utility window for editing called the Inspector (not shown). The Inspector panel invoked by button 308 then has room for static settings in the patch or editing source code if the patch is a code based patch. Only one patch may be selected at a time for editing in the Inspector.

Viewer button 309 can be used to display a viewing window (not shown) that instantly displays a rendering result of the patches currently being edited in editing window 302. As described above, a patch may include another patch a child patch. Similarly, a patch may be a child of another patch (e.g., parent patch). Button 305 is used to display and edit a parent patch of a selected patch currently displayed in the editing window 302. By hiding the parent and/or child patches, a user can focus on the patches that are currently being edited without the distraction from other remote patches.

Figure 3B:
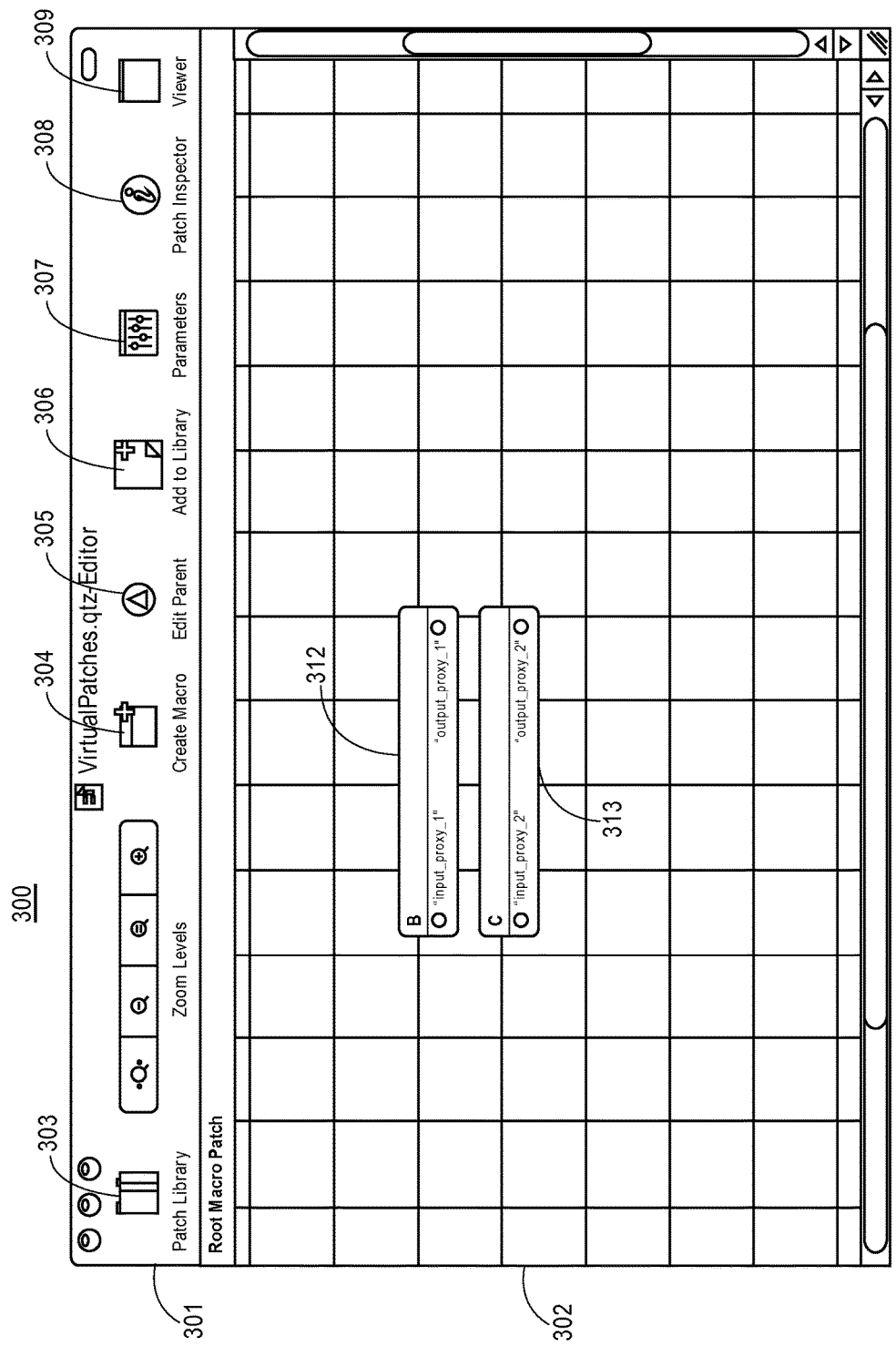

As described above, one or more patches can be selectively exported or shared with another user. According to one embodiment, button 304 may be used to create a virtual macro based on the selected patches. In this example, patches 312 and 313 are selected. When a user activates button 304, GUI 300 may prompt the user, for example, by displaying a dialog box 310 to allow the user to enter the name for the macro being created, including a copyright statement and/or a brief description for the macro, as shown in FIG. 3B. In effect, patches 312 and 313 are selected and merged into a macro patch and can be saved as a composition file (e.g., B-C.qtz file), which can be shared with another user.

In addition, a dependency analysis is performed to determine any patches related to patches 312-313, including any parent or child patches. Furthermore, the source code associated with patches 312-313 and their related patches is extracted. The source code is extracted only for patches 312-313 and their related patches (e.g., having a dependency relationship with patch 312 or patch 313), without the source code of any unrelated patches. The exported composition file may include the entire extracted source code or alternatively, a portion of the extracted source with references or links to external source code (e.g., commonly provided source code or primitives). An example of pseudo code of the macro patch is shown in Appendix B.

Figure 3C:
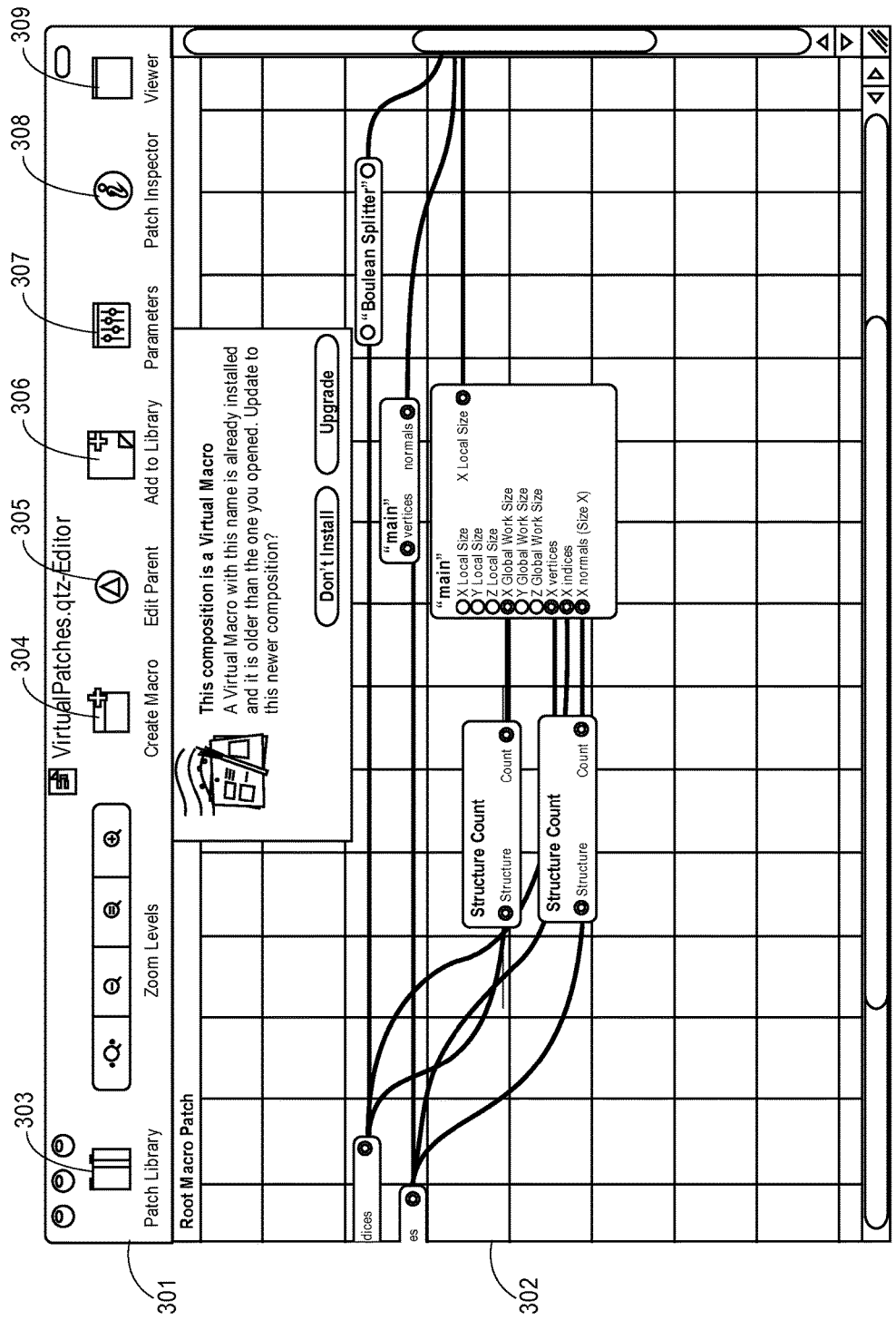

As a result, the exported composition file can be shared with another user. When the exported composition is installed and loaded in another system (e.g., imported), the system automatically checks whether a similar composition or patch exists in the system. For example, if a composition having the same identifier has already been installed in the system, the system may compare which one has a newer version. If the one being installed has a newer version, the user may be prompted to indicate whether the user would like to update the existing one (e.g., stored or installed in the local system), as shown in FIG. 3C. If so, the existing composition file or some of the patches referenced therein may be replaced by the imported ones.

Figure 3D:
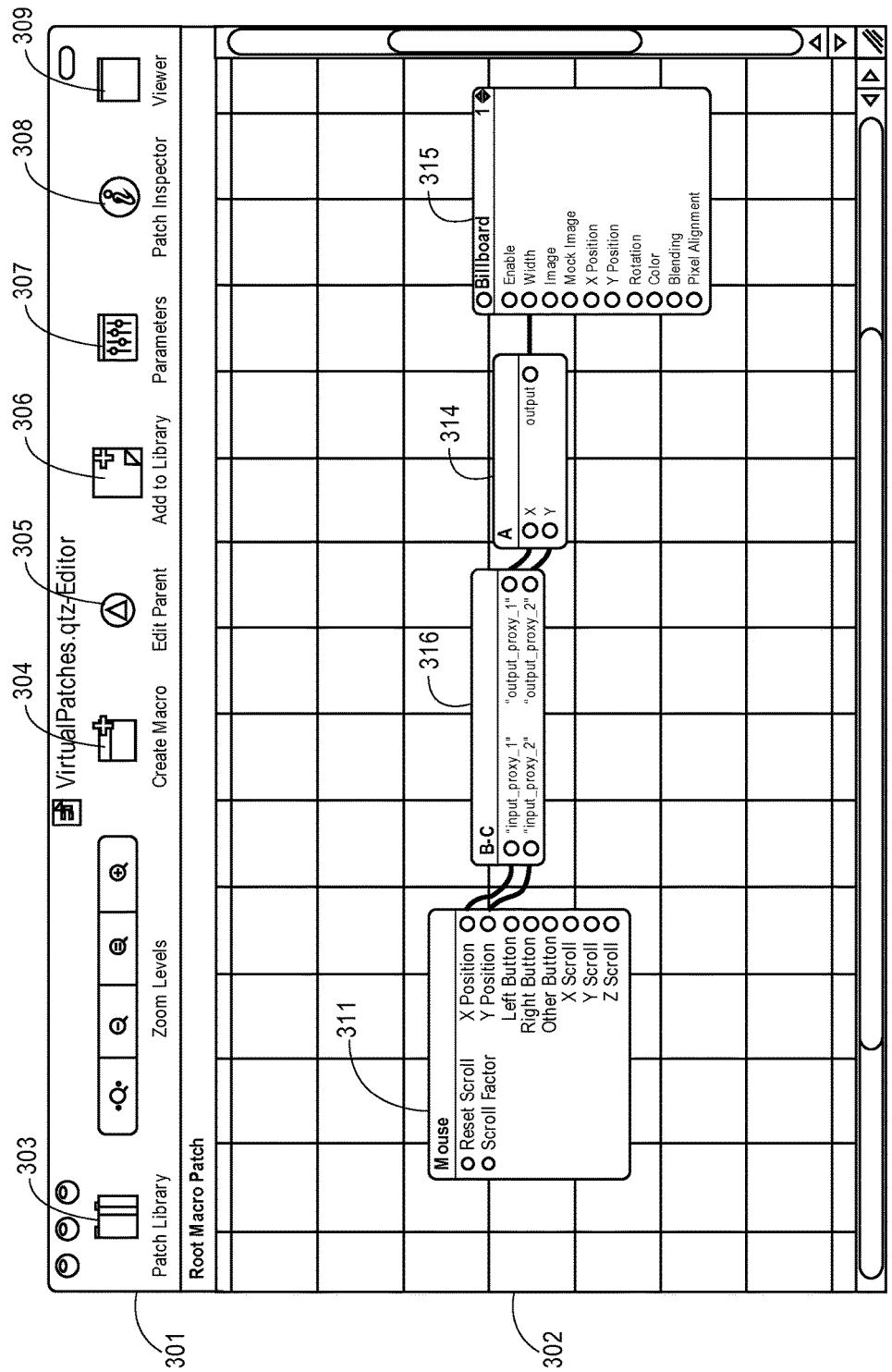

Referring back to FIG. 3A, once a macro patch has been created, the existing patches 312 and 313 may be replaced by the newly created macro patch 316, encapsulating functionality of patches 312-313 as shown in FIG. 3D. An example of underlying pseudo code is listed in Appendix C.

FIG. 3E is screenshot from which a user can display a list of libraries that are available for assembling a composition. For example, the GUI as shown in FIG. 3E can be displayed by activating patch library button 303 of FIG. 3A. GUI as shown in FIG. 3E includes a first window 320 listing certain libraries available for selection. When a library is selected from window 320, certain metadata associated with the selected library is displayed in a second window 321, such as, for example, copyright statements and description, etc. Such information may be entered when the library is created, for example, using dialog box 310 of FIG. 3A. Further actions available for the selected library can be displayed by activating button 322, which displays a list of possible actions as shown in FIG. 8F, including importing and exporting the selected library. Field 323 can be used to search a particular library or libraries available in the system.

Note that throughout this application, for the purpose of illustration, a button is utilized as an example of a user interface to receive a user input. However, it is not so limited. Other types of user interfaces, such as pulled-down or popped-up menus, as well as voice interactive commands may also be applied.

Figure 4:
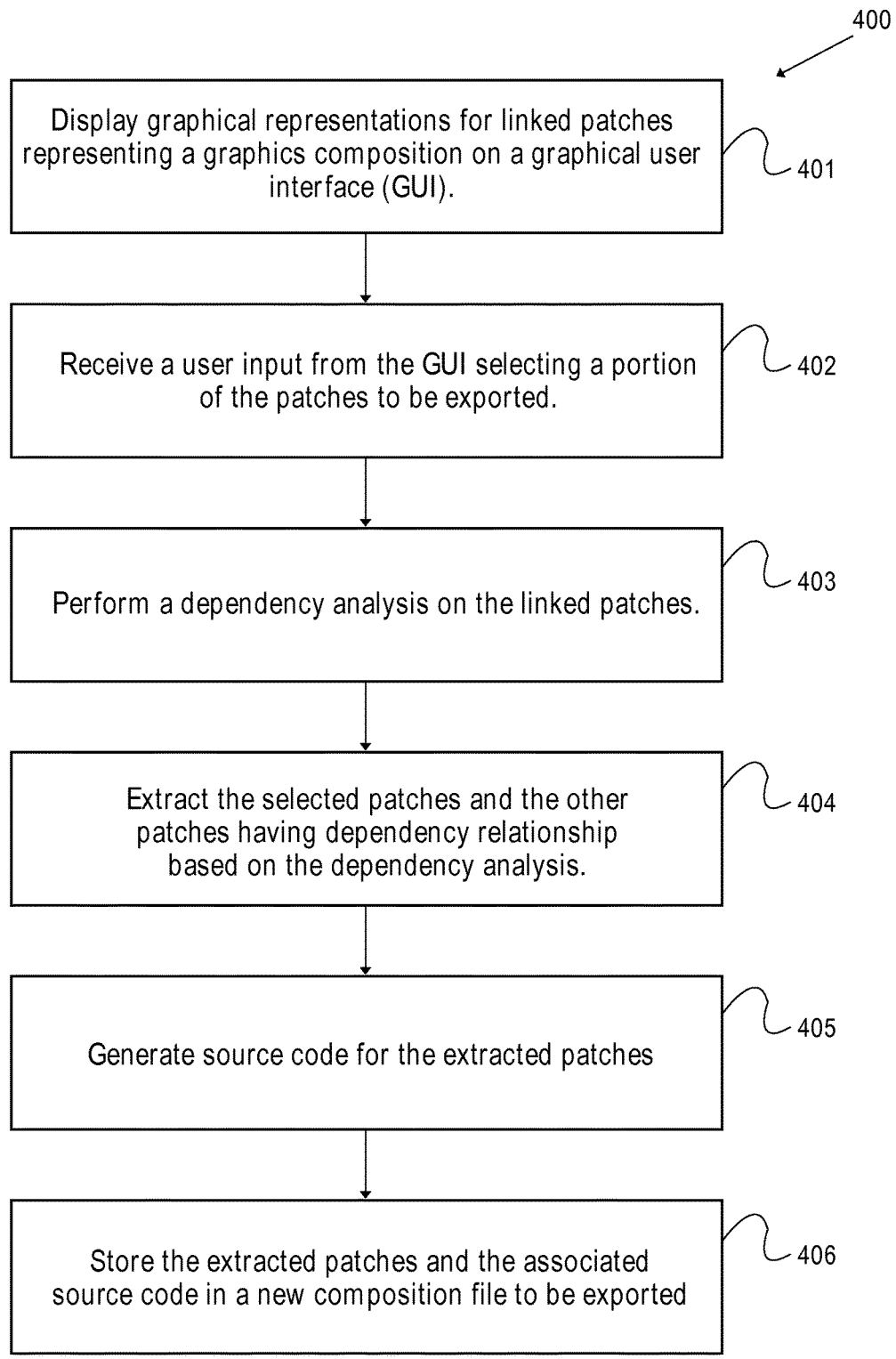
FIG. 4 is a flow diagram illustrating a process performed by a graphics development framework according to one embodiment.

FIG. 4 is a flow diagram illustrating a process performed by a graphics development framework according to one embodiment. Note that process 400 may be performed by processing logic which may include software, hardware, or a combination of thereof. For example, process 400 may be performed by system 200 of FIG. 2. Referring to FIG. 4, at block 401, patches are linked and displayed in a graphical user interface of a graphics development framework such as an editing window of the framework, where the linked patches represent a composition. At block 402, a user selection of one or more of the linked patches for export or sharing is received, for example, by highlighting the patches from the editing window. In addition, the user may indicate that the selected patches are to be exported, for example, by activating the "add to library" button or "create macro" button.

Note that operations of both 401 and 402 may be replaced by processing logic (either in software, hardware, or a combination thereof) that determines what patches to link together and what patches to select and send for processing. Thus one embodiment may require a user interaction and another may perform the workflow as a function of their applications through an application programming interface (API) (also referred to as program logic). That is, it is possible for an application to select and invoke the workflow itself. For example, an iDVD application invokes many of virtual patches on the fly when a user is creating a DVD.

In response to the selection (at block 402), at block 403, a dependency analysis is automatically performed to determine the dependency relationships among the selected patches and any other related patches. As described above, a patch may be a parent or a child of another patch. Although those related patches are not currently displayed, the dependency analysis will reveal those parent and/or child patches since they have a dependency relationship with the selected patches. At block 404, based on the dependency analysis, those related parches are extracted from the original linked patches and at block 405, source code associated with the extracted patches is generated. The extracted patches and the associated source code are stored in a new composition file for export. They can also be added to an existing library of the user's choice. Other operations may also be performed.

Figure 5:
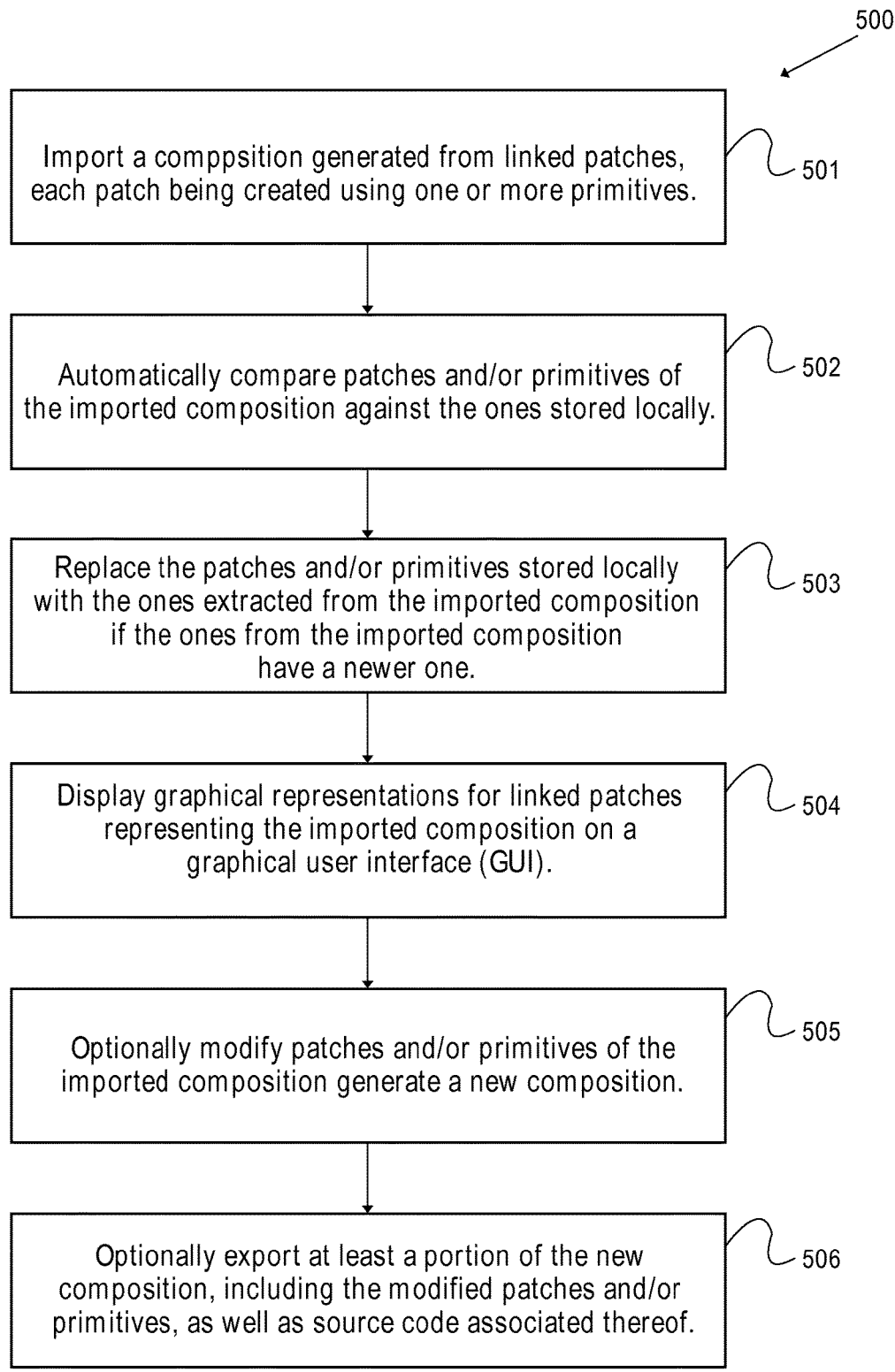
FIG. 5 is a flow diagram illustrating a process performed by a graphics development framework according to one embodiment.

FIG. 5 is a flow diagram illustrating a process performed by a graphics development framework according to one embodiment. Note that process 500 may be performed by processing logic which may include software, hardware, or a combination of thereof. For example, process 500 may be performed by system 200 of FIG. 2. Referring to FIG. 5, at block 501, a composition generated from linked patches is imported from another system, where each patch includes one or more sub-patches or primitives. At block 502, processing logic compares patches and/or primitives of the imported composition against the corresponding ones stored or installed locally. For example, processing logic may compare the versions of the patches in order to determine which ones are new. At block 503, the patches or primitives stored locally are replaced with the imported ones if the imported ones have a newer version. At block 504, the imported composition is displayed in a graphical user interface of the development framework such as the editing window of the development framework and optionally at block 505, certain imported patches may be modified and a newer version may also be exported again at block 506, including the associated source code. Other operations may also be performed.

Figure 6:
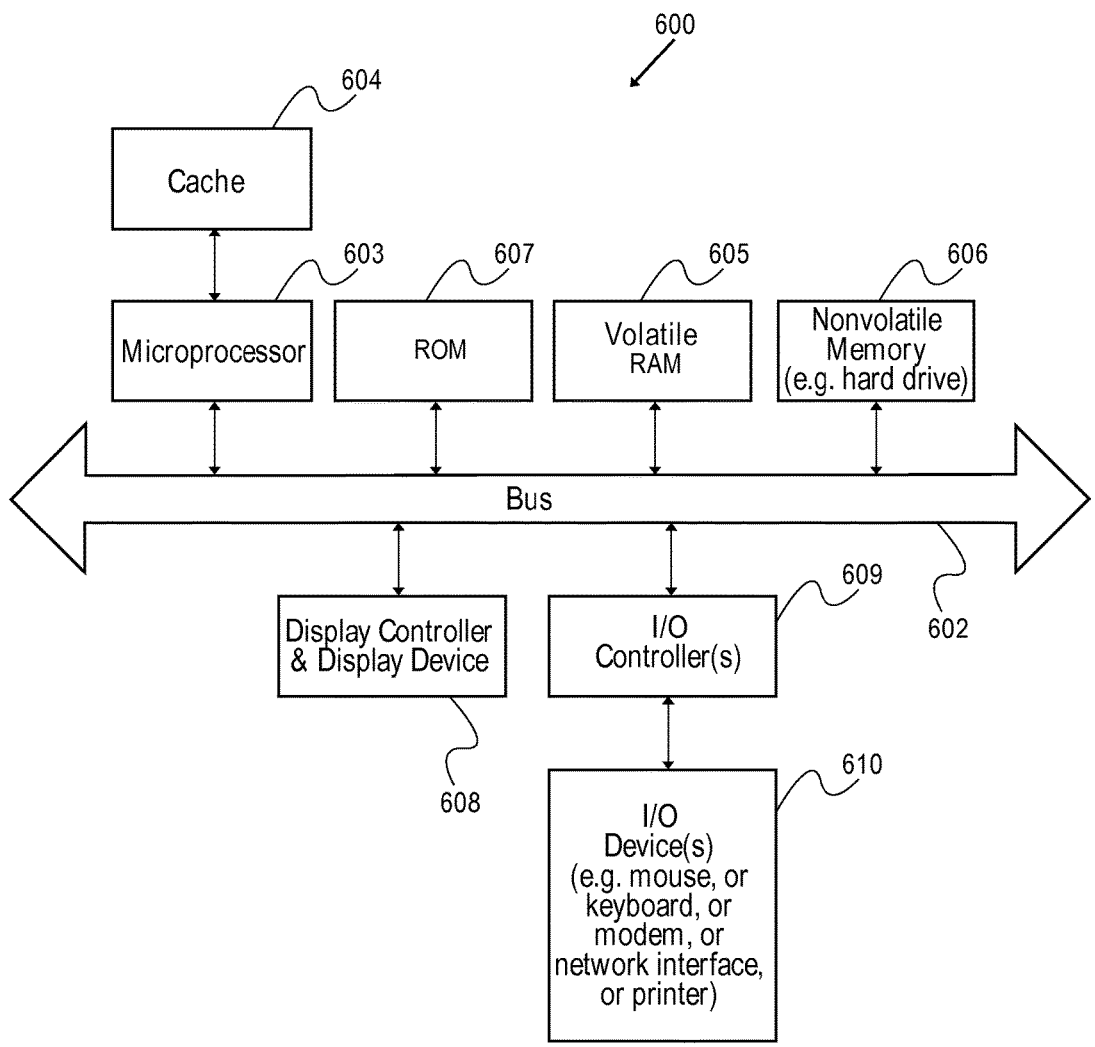
FIG. 6 is a block diagram of a data processing system, which may be used with one embodiment of the invention.

FIG. 6 is a block diagram of a data processing system, which may be used with one embodiment of the invention. For example, the system 600 shown in FIG. 6 may be used as systems 200 of FIG. 2. Note that while FIG. 6 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 6 may, for example, be an Apple Macintosh computer or MacBook, or an IBM compatible PC.

As shown in FIG. 6, the computer system 600, which is a form of a data processing system, includes a bus or interconnect 602 which is coupled to one or more microprocessors 603 and a ROM 607, a volatile RAM 605, and a non-volatile memory 606. The microprocessor 603 is coupled to cache memory 604. The bus 602 interconnects these various components together and also interconnects these components 603, 607, 605, and 606 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices.

Techniques for creating, exporting, sharing, and installing graphics functional blocks have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Appendix A

```xml
<?xml version="1.0" encoding="UTF-8" ?>
<!DOCTYPE plist (View Source for full doctype...)>
<plist version="1.0">
<dict>
<key>rootPatch</key>
<dict>
<key>class</key>
<string>QCPatch</string>
<key>state</key>
<dict>
<key>connections</key>
<dict>
<key>connection_1</key>
<dict>
<key>destinationNode</key>
<string>JavaScript_1</string>
<key>destinationPort</key>
<string>input</string>
<key>sourceNode</key>
<string>Mouse_1</string>
<key>sourcePort</key>
<string>outputX</string>
  </dict>
<key>connection_2</key>
<dict>
<key>destinationNode</key>
<string>JavaScript_2</string>
<key>destinationPort</key>
<string>input</string>
<key>sourceNode</key>
<string>Mouse_1</string>
<key>sourcePort</key>
<string>outputY</string>
  </dict>
<key>connection_3</key>
<dict>
<key>destinationNode</key>
<string>JavaScript_3</string>
<key>destinationPort</key>
<string>X</string>
<key>sourceNode</key>
<string>JavaScript_1</string>
<key>sourcePort</key>
<string>output</string>
  </dict>
<key>connection_4</key>
```

```xml
<dict>
    <key>destinationNode</key>
    <string>JavaScript_3</string>
    <key>destinationPort</key>
    <string>Y</string>
    <key>sourceNode</key>
    <string>JavaScript_2</string>
    <key>sourcePort</key>
    <string>output</string>
</dict>
<key>connection_5</key>
<dict>
    <key>destinationNode</key>
    <string>Billboard_1</string>
    <key>destinationPort</key>
    <string>inputScale</string>
    <key>sourceNode</key>
    <string>JavaScript_3</string>
    <key>sourcePort</key>
    <string>output</string>
</dict>
</dict>
<key>nodes</key>
<array>
<dict>
    <key>class</key>
    <string>QCMouse</string>
    <key>key</key>
    <string>Mouse_1</string>
    <key>state</key>
<dict>
    <key>integrate</key>
    <integer>1</integer>
    <key>integrateMagnification</key>
    <integer>0</integer>
    <key>integrateRotation</key>
    <integer>0</integer>
    <key>multitouch</key>
    <integer>0</integer>
</dict>
</dict>
<dict>
    <key>class</key>
    <string>QCBillboard</string>
    <key>key</key>
    <string>Billboard_1</string>
    <key>state</key>
<dict>
    <key>CIRendering</key>
```

```
        <false />
        <key>optimizedRendering</key>
        <false />
        <key>pixelAligned</key>
        <false />
        <key>sizeMode</key>
        <string>autoHeight</string>
      </dict>
    </dict>
  <dict>
    <key>class</key>
    <string>QCJavaScript</string>
    <key>key</key>
    <string>JavaScript_3</string>
    <key>state</key>
  <dict>
    <key>newMode</key>
    <integer>1</integer>
    <key>numberOfInputs</key>
    <integer>2</integer>
    <key>numberOfOutputs</key>
    <integer>1</integer>
      </dict>
    </dict>
  <dict>
    <key>class</key>
    <string>QCJavaScript</string>
    <key>key</key>
    <string>JavaScript_1</string>
    <key>state</key>
  <dict>
    <key>newMode</key>
    <integer>1</integer>
    <key>numberOfInputs</key>
    <integer>1</integer>
    <key>numberOfOutputs</key>
    <integer>1</integer>
      </dict>
    </dict>
  <dict>
    <key>class</key>
    <string>QCJavaScript</string>
    <key>key</key>
    <string>JavaScript_2</string>
    <key>state</key>
  <dict>
    <key>newMode</key>
    <integer>1</integer>
    <key>numberOfInputs</key>
```

```
<integer>1</integer>
<key>numberOfOutputs</key>
<integer>1</integer>
   </dict>
   </dict>
   </array>
   </dict>
   </dict>
<key>virtualPatches</key>
<dict />
   </dict>
   </plist>
```

Appendix B

```xml
<?xml version="1.0" encoding="UTF-8" ?>
<!DOCTYPE plist (View Source for full doctype...)>
<plist version="1.0">
<dict>
<key>copyright</key>
<string>Troy</string>
<key>description</key>
<string>Demonstration for Virtual Patches</string>
<key>name</key>
<string>B-C</string>
<key>rootPatch</key>
<dict>
<key>class</key>
<string>QCPatch</string>
<key>state</key>
<dict>
<key>nodes</key>
<array>
<dict>
<key>class</key>
<string>QCJavaScript</string>
<key>key</key>
<string>JavaScript_1</string>
<key>state</key>
<dict>
<key>numberOfInputs</key>
<integer>1</integer>
<key>numberOfOutputs</key>
<integer>1</integer>
</dict>
</dict>
<dict>
<key>class</key>
<string>QCJavaScript</string>
<key>key</key>
<string>JavaScript_2</string>
<key>state</key>
<dict>
<key>numberOfInputs</key>
<integer>1</integer>
<key>numberOfOutputs</key>
<integer>1</integer>
</dict>
</dict>
</array>
<key>publishedInputPorts</key>
```

```xml
<array>
  <dict>
    <key>key</key>
    <string>input_proxy_1</string>
    <key>node</key>
    <string>JavaScript_1</string>
    <key>port</key>
    <string>input</string>
  </dict>
  <dict>
    <key>key</key>
    <string>input_proxy_2</string>
    <key>node</key>
    <string>JavaScript_2</string>
    <key>port</key>
    <string>input</string>
  </dict>
</array>
<key>publishedOutputPorts</key>
<array>
  <dict>
    <key>key</key>
    <string>output_proxy_1</string>
    <key>node</key>
    <string>JavaScript_1</string>
    <key>port</key>
    <string>output</string>
  </dict>
  <dict>
    <key>key</key>
    <string>output_proxy_2</string>
    <key>node</key>
    <string>JavaScript_2</string>
    <key>port</key>
    <string>output</string>
  </dict>
</array>
    </dict>
  </dict>
  <key>virtualPatch</key>
  <string>/b-c</string>
  <key>virtualPatches</key>
  <dict />
</dict>
</plist>
```

Appendix C

```xml
<?xml version="1.0" encoding="UTF-8" ?>
<!DOCTYPE plist (View Source for full doctype...)>
<plist version="1.0">
<dict>
<key>rootPatch</key>
<dict>
<key>class</key>
<string>QCPatch</string>
<key>state</key>
<dict>
<key>connections</key>
<dict>
<key>connection_2</key>
<dict>
<key>destinationNode</key>
<string>JavaScript_3</string>
<key>destinationPort</key>
<string>X</string>
<key>sourceNode</key>
<string>Patch_2</string>
<key>sourcePort</key>
<string>output_proxy_1</string>
    </dict>
<key>connection_4</key>
<dict>
<key>destinationNode</key>
<string>JavaScript_3</string>
<key>destinationPort</key>
<string>Y</string>
<key>sourceNode</key>
<string>Patch_2</string>
<key>sourcePort</key>
<string>output_proxy_2</string>
    </dict>
<key>connection_5</key>
<dict>
<key>destinationNode</key>
<string>Billboard_1</string>
<key>destinationPort</key>
<string>inputScale</string>
<key>sourceNode</key>
<string>JavaScript_3</string>
<key>sourcePort</key>
<string>output</string>
    </dict>
<key>connection_6</key>
```

```xml
<dict>
    <key>destinationNode</key>
    <string>Patch_2</string>
    <key>destinationPort</key>
    <string>input_proxy_1</string>
    <key>sourceNode</key>
    <string>Mouse_1</string>
    <key>sourcePort</key>
    <string>outputX</string>
</dict>
<key>connection_7</key>
<dict>
    <key>destinationNode</key>
    <string>Patch_2</string>
    <key>destinationPort</key>
    <string>input_proxy_2</string>
    <key>sourceNode</key>
    <string>Mouse_1</string>
    <key>sourcePort</key>
    <string>outputY</string>
</dict>
</dict>
<key>nodes</key>
<array>
<dict>
    <key>class</key>
    <string>QCMouse</string>
    <key>key</key>
    <string>Mouse_1</string>
    <key>state</key>
    <dict>
        <key>integrate</key>
        <integer>1</integer>
        <key>integrateMagnification</key>
        <integer>0</integer>
        <key>integrateRotation</key>
        <integer>0</integer>
        <key>multitouch</key>
        <integer>0</integer>
    </dict>
</dict>
<dict>
    <key>class</key>
    <string>QCBillboard</string>
    <key>key</key>
    <string>Billboard_1</string>
    <key>state</key>
    <dict>
        <key>CIRendering</key>
```

```
        <false />
        <key>optimizedRendering</key>
        <false />
        <key>pixelAligned</key>
        <false />
        <key>sizeMode</key>
        <string>autoHeight</string>
          </dict>
          </dict>
    <dict>
        <key>class</key>
        <string>QCJavaScript</string>
        <key>key</key>
        <string>JavaScript_3</string>
        <key>state</key>
    <dict>
        <key>newMode</key>
        <integer>1</integer>
        <key>numberOfInputs</key>
        <integer>2</integer>
        <key>numberOfOutputs</key>
        <integer>1</integer>
          </dict>
          </dict>
    <dict>
        <key>class</key>
        <string>/b-c</string>
        <key>key</key>
        <string>Patch_2</string>
          </dict>
          </array>
          </dict>
          </dict>
        <key>virtualPatches</key>
    <dict>
        <key>/b-c</key>
    <dict>
        <key>rootPatch</key>
    <dict>
        <key>class</key>
        <string>QCPatch</string>
        <key>state</key>
    <dict>
        <key>nodes</key>
    <array>
    <dict>
        <key>class</key>
        <string>QCJavaScript</string>
        <key>key</key>
```

```
<string>JavaScript_1</string>
<key>state</key>
<dict>
    <key>newMode</key>
    <integer>1</integer>
    <key>numberOfInputs</key>
    <integer>1</integer>
    <key>numberOfOutputs</key>
    <integer>1</integer>
</dict>
</dict>
<dict>
    <key>class</key>
    <string>QCJavaScript</string>
    <key>key</key>
    <string>JavaScript_2</string>
    <key>state</key>
<dict>
    <key>newMode</key>
    <integer>1</integer>
    <key>numberOfInputs</key>
    <integer>1</integer>
    <key>numberOfOutputs</key>
    <integer>1</integer>
</dict>
</dict>
</array>
<key>publishedInputPorts</key>
<array>
<dict>
    <key>key</key>
    <string>input_proxy_1</string>
    <key>node</key>
    <string>JavaScript_1</string>
    <key>port</key>
    <string>input</string>
</dict>
<dict>
    <key>key</key>
    <string>input_proxy_2</string>
    <key>node</key>
    <string>JavaScript_2</string>
    <key>port</key>
    <string>input</string>
</dict>
</array>
<key>publishedOutputPorts</key>
<array>
<dict>
```

```
    <key>key</key>
    <string>output_proxy_1</string>
    <key>node</key>
    <string>JavaScript_1</string>
    <key>port</key>
    <string>output</string>
       </dict>
  <dict>
    <key>key</key>
    <string>output_proxy_2</string>
    <key>node</key>
    <string>JavaScript_2</string>
    <key>port</key>
    <string>output</string>
       </dict>
       </array>
       </dict>
       </dict>
       </dict>
       </dict>
       </dict>
       </plist>
```

What is claimed is:

1. A machine-implemented method, comprising:
    importing a motion graphics composition comprising a plurality of linked patches into an editing window of a graphical user interface (GUI), the plurality of linked patches collectively representing a motion graphics composition, wherein each patch comprises a subroutine of source code that, when compiled and executed, renders a graphics object of the motion graphics composition;
    displaying, in the editing window of the GUI, the plurality of linked patches, wherein the plurality of linked patches includes a first patch and a second patch, the second patch having an input port visually and dependently linked with an output port of the first patch, wherein the links between linked patches define a dependency and a data flow that defines an order in which graphics motion data is processed between the linked patches for the motion graphics composition;
    in response to selecting one or more patches from the displayed plurality of linked patches, performing a dependency analysis of the selected patches to determine one or more related patches that have a dependency relationship with the selected patches, including identifying a relationship between the first patch and the second patch in which a value that is output by the first patch is used as an input value by the second patch;
    extracting source code associated with the selected patches and the related patches based on the dependency analysis without extracting source code of unselected and unrelated patches; and
    exporting the selected patches, the related patches, and the extracted source code as a composition file to be shared with another user to enable the user to recreate the motions graphics composition without having to rewrite the extracted source code.

2. The method of claim 1, further comprising:
    displaying a viewing window of the GUI to instantly display a result of rendering of the plurality of linked patches displayed in the editing window.

3. The method of claim 2, further comprising:
    displaying a toolbar within the editing window having a plurality of buttons;
    receiving an activation from a first button displayed on the toolbar for exporting; and
    in response to the activation of the first button, performing the dependency analysis and extracting source code of the selected patches and the related patches.

4. The method of claim 3, further comprising exporting into a composition file, prompting a user for a filename of the composition file to be shared with another user, including a copyright statement and a brief description of the composition file.

5. The method of claim 3, further comprising:
    in response to an activation of a second button from the toolbar, creating a macro patch representing the selected patches from the editing window;
    replacing the selected patches with the macro patch in the editing window; and
    reconnecting the macro patch with patches previously connected with the replaced patches.

6. The method of claim 1, further comprising:
    importing a second composition file having a plurality of patches, the plurality of patches being exported from another user;
    determining whether one or more of the patches in the second composition file exist in a local system; and
    replacing the one or more patches that exist in the local system with the corresponding one or more patches from the second composition file.

7. The method of claim 6, wherein determining whether one or more patches exist comprises:
    searching in the local system based on an identifier of each patch from the second composition file to determine whether a particular patch from the second composition file exists in the local system; and
    comparing a version of each patch that exists in the local system with a version of the corresponding patch from the second composition file.

8. The method of claim 1, wherein the first patch comprises a plurality of output ports wherein at least one of the output ports is not linked to a selected patch and is not linked to a related patch; and wherein extracting source code associated with the first patch excludes extracting source code associated with the at least one output port that is not linked to a selected patch and is not linked to a related patch.

9. The method of claim 1, wherein each patch renders a motion graphics object.

10. The method of claim 1, the patch further comprising:
    compiled source code such that the patch is executable without recompilation.

11. The method of claim 1, further comprising:
    automatically comparing patches of the imported graphics composition against patches stored locally; and
    replacing at least one patch stored locally with a patch extracted from the imported graphics composition, in response to determining that the at least one patch imported with the composition has a newer version than the locally stored patch.

12. The method of claim 1, wherein a workflow defined by the selected patches, related patches, and extracted source code is invoked in response to an application that references the composition file receiving a user interaction.

13. The method of claim 1, further comprising extracting compiled source code associated with the selected patches and related patches based on the dependency analysis such that the selected patches are executable without recompilation.

14. A machine-readable storage medium having instructions stored therein, which when executed by a machine, cause the machine to perform a method, the method comprising:
    importing a motion graphics composition comprising a plurality of linked patches into an editing window of a graphical user interface (GUI), the plurality of linked patches collectively representing the motion graphics composition, wherein each patch comprises a subroutine of compiled source code that, when compiled and executed, renders a graphics object of the motion graphics composition;
    displaying, in the editing window of the GUI, the plurality of linked patches, wherein the plurality of linked patches includes a first patch and a second patch, the second patch having an input port visually and dependently linked with an output port of the first patch, wherein the links between linked patches define a dependency and a data flow that defines an order in which graphical motion data is processed between the linked patches for the motion graphics composition;
    in response to selecting one or more patches from the displayed plurality of linked patches, performing a dependency analysis of the selected patches to determine one or more related patches that have a dependency relationship with the selected patches, including identifying a relationship between the first patch and the second patch in which a value that is output by the first patch is used an input value by the second patch;

extracting source code associated with the selected patches and the related patches based on the dependency analysis without extracting source code of unselected and unrelated patches; and exporting the selected patches, the related patches, and the extracted source code as a composition file to be shared with another user to enable the user to recreate the motions graphics composition without having to rewrite the extracted source code.

15. The machine-readable storage medium of claim 14, wherein the method further comprises:

displaying a viewing window of the GUI to instantly display a result of rendering of the plurality of linked patches displayed in the editing window.

16. The machine-readable storage medium of claim 15, wherein the method further comprises:

displaying a toolbar within the editing window having a plurality of buttons;

receiving an activation from a first button displayed on the toolbar for exporting; and in response to the activation of the first button, performing the dependency analysis and extracting source code of the selected patches and related patches.

17. The machine-readable storage medium of claim 16, wherein the method further comprises exporting into a composition file, prompting a user for a filename of the composition file to be shared with another user, including a copyright statement and a brief description of the composition file.

18. The machine-readable storage medium of claim 16, wherein the method further comprises:

in response to an activation of a second button from the toolbar, creating a macro patch representing the selected patches from the editing window;

replacing the selected patches with the macro patch in the editing window; and reconnecting the macro patch with patches previously connected with the replaced patches.

19. The machine-readable storage medium of claim 14, wherein the method further comprises:

importing a second composition file having a plurality of patches, the plurality of patches being exported from another user;

determining whether one or more of the patches in the second composition file exist in a local system; and replacing the one or more patches that exist in the local system with the corresponding one or more patches from the second composition file.

20. The machine-readable storage medium of claim 19, wherein determining whether one or more patches exist comprises:

searching in the local system based on an identifier of each patch from the second composition file to determine whether a particular patch from the second composition file exists in the local system; and comparing a version of each patch that exists in the local system with a version of the corresponding patch from the second composition file.

21. The machine-readable storage medium of claim 14, wherein the first patch comprises a plurality of output ports wherein at least one of the output ports is not linked to a selected patch and is not linked to a related patch; and wherein extracting source code associated with the first patch excludes extracting source code associated with the at least one output port that is not linked to a selected patch and is not linked to a related patch.

22. A system, comprising:

a graphical user interface GUI having an editing window configured to import a composition comprising a plurality of linked patches into the editing window of the GUI, the editing window configured to display the plurality of linked patches, wherein the plurality of linked patches includes a first patch and a second patch, the second patch having an input port visually and dependently linked with an output port of the first patch, wherein the links between patches define a dependency and a data flow that defines an order in which graphical motion data is processed between the linked patches for the motion graphics composition;

a dependency analyzer configured to perform, in response to selecting one or more patches from the displayed plurality of linked patches, a dependency analysis of the selected patches to determine one or more related patches that have a dependency relationship with the selected patches, including identifying a relationship between the first patch and the second patch in which a value that is output by the first patch is used as an input value by the second patch;

a code generator configured to extract source code associated with the selected patches and the related patches based on the dependency analysis without extracting source code of unselected and unrelated patches; and an exporter configured to export the selected patches, the related patches, and the extracted source code as a composition file to be shared with another user to enable the user to recreate the motions graphics composition without having to rewrite the extracted source code.

23. The system of claim 22, further comprising a graphical user interface (GUI), wherein the GUI comprises:

a viewing window to instantly display a result of rendering of the plurality of linked patches displayed in the editing window.

24. The system of claim 23, wherein the GUI further comprises a toolbar displayed within the editing window, the toolbar having a plurality of buttons, including a first button to receive a user input for exporting, wherein in response to the activation of the first button, the dependency analyzer is configured to perform the dependency analysis and the code generator is configured to extract source code of the selected patches.

* * * * *